US012020639B2

(12) United States Patent
Li et al.

(10) Patent No.: US 12,020,639 B2
(45) Date of Patent: Jun. 25, 2024

(54) DRIVE METHOD OF DISPLAY PANEL, STORAGE MEDIUM, DRIVE DEVICE AND DISPLAY DEVICE

(71) Applicants: Hefei BOE Optoelectronics Technology Co., Ltd., Anhui (CN); BOE Technology Group Co., Ltd., Beijing (CN)

(72) Inventors: Jingyong Li, Beijing (CN); Fei Xu, Beijing (CN); Yanbin Wang, Beijing (CN); Jun Hong, Beijing (CN); Wenhong Tian, Beijing (CN)

(73) Assignees: Hefei BOE Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 424 days.

(21) Appl. No.: 17/423,468

(22) PCT Filed: Oct. 30, 2020

(86) PCT No.: PCT/CN2020/125158
§ 371 (c)(1),
(2) Date: Jul. 15, 2021

(87) PCT Pub. No.: WO2022/088017
PCT Pub. Date: May 5, 2022

(65) Prior Publication Data
US 2022/0375404 A1 Nov. 24, 2022

(51) Int. Cl.
*G09G 3/32* (2016.01)
*G09G 3/3233* (2016.01)

(52) U.S. Cl.
CPC ... *G09G 3/3233* (2013.01); *G09G 2320/0276* (2013.01)

(58) Field of Classification Search
CPC ......... G09G 3/3233; G09G 2300/0426; G09G 2300/0819; G09G 2300/0842;
(Continued)

(56) References Cited

U.S. PATENT DOCUMENTS 8,519,994 B2 * 8/2013 Chiu ...................... G09G 3/344 345/212
10,121,406 B2 * 11/2018 Jang ..................... G09G 3/2092
(Continued)

FOREIGN PATENT DOCUMENTS

CN 106101679 A 11/2016
CN 109920372 A 6/2019
(Continued)

*Primary Examiner* — Joe H Cheng
(74) *Attorney, Agent, or Firm* — Ling Wu; Stephen Yang; Ling and Yang Intellectual Property

(57) ABSTRACT

Provided are a drive method of a display panel, a storage medium, a drive device and a display device. The drive method includes: in an Nth frame, applying a first voltage to the second electrode and a first data signal matched with a first voltage to the first electrode through the pixel drive circuit based on grayscale data of the Nth frame; wherein N is a positive integer; in an (N+1)th frame applying a second voltage to the second electrode and a second data signal matched with the second voltage to the first electrode through the pixel drive circuit based on grayscale data of the (N+1)th frame, wherein the first voltage is different from the second voltage.

20 Claims, 9 Drawing Sheets

(58) Field of Classification Search
CPC ... G09G 2300/0861; G09G 2310/0251; G09G 2310/061; G09G 2310/08; G09G 2320/0276
See application file for complete search history.

(56) References Cited

U.S. PATENT DOCUMENTS

| | | | | |
|---|---|---|---|---|
| 11,030,958 | B2 * | 6/2021 | Chang | G09G 3/3291 |
| 11,151,931 | B2 * | 10/2021 | Kim | G09G 3/32 |
| 11,211,006 | B2 * | 12/2021 | Zhang | G09G 3/3225 |
| 2008/0012811 | A1 | 1/2008 | Sung et al. | |
| 2008/0024482 | A1 * | 1/2008 | Gates | H04N 1/46<br>345/214 |
| 2009/0322660 | A1 * | 12/2009 | Chung | G09G 3/3648<br>345/87 |
| 2017/0004760 | A1 * | 1/2017 | Jang | G09G 3/3677 |
| 2018/0196765 | A1 | 7/2018 | Kim et al. | |
| 2019/0325828 | A1 | 10/2019 | Zhang et al. | |
| 2020/0090590 | A1 | 3/2020 | Kim et al. | |

FOREIGN PATENT DOCUMENTS

| | | | |
|---|---|---|---|
| CN | 110033735 | A | 7/2019 |
| CN | 110930950 | A | 3/2020 |
| CN | 111261102 | A | 6/2020 |

* cited by examiner

| | | | | |
|---|---|---|---|---|
| (x1,y1) | (x2,y2) | (x3,y3) | (x4,y4) | (x5,y5) |
| (x6,y6) | (x7,y7) | (x8,y8) | (x9,y9) | (x10,y10) |
| (x11,y11) | (x12,y12) | (x13,y13) | (x14,y14) | (x15,y15) |
| (x16,y16) | (x17,y17) | (x18,y18) | (x19,y19) | (x20,y20) |
| (x21,y21) | (x22,y22) | (x23,y23) | (x24,y24) | (x25,y25) |

| Gray-scale | Bright-ness | Gray-scale | Bright-ness | Gray-scale | Bright-ness | Gray-scale | Bright-ness | Gray-scale | Bright-ness | Gray-scale | Bright-ness | Gray-scale | Bright-ness | Gray-scale | Bright-ness | Gray-scale | Bright-ness |
|---|---|---|---|---|---|---|---|---|---|---|---|---|---|---|---|---|---|
| 1 | 0 | 31 | 10 | 61 | 37 | 91 | 83 | 121 | 146 | 151 | 228 | 181 | 328 | 211 | 445 | 241 | 581 |
| 2 | 0 | 32 | 10 | 62 | 38 | 92 | 85 | 122 | 149 | 152 | 231 | 182 | 331 | 212 | 449 | 242 | 586 |
| 3 | 0 | 33 | 11 | 63 | 40 | 93 | 86 | 123 | 151 | 153 | 234 | 183 | 335 | 213 | 454 | 243 | 590 |
| 4 | 0 | 34 | 12 | 64 | 41 | 94 | 88 | 124 | 154 | 154 | 237 | 184 | 339 | 214 | 458 | 244 | 595 |
| 5 | 0 | 35 | 12 | 65 | 42 | 95 | 90 | 125 | 156 | 155 | 240 | 185 | 342 | 215 | 462 | 245 | 600 |
| 6 | 0 | 36 | 13 | 66 | 44 | 96 | 92 | 126 | 159 | 156 | 243 | 186 | 346 | 216 | 467 | 246 | 605 |
| 7 | 0 | 37 | 14 | 67 | 45 | 97 | 94 | 127 | 161 | 157 | 246 | 187 | 350 | 217 | 471 | 247 | 610 |
| 8 | 1 | 38 | 14 | 68 | 46 | 98 | 96 | 128 | 164 | 158 | 250 | 188 | 353 | 218 | 475 | 248 | 615 |
| 9 | 1 | 39 | 15 | 69 | 48 | 99 | 98 | 129 | 166 | 159 | 253 | 189 | 357 | 219 | 480 | 249 | 620 |
| 10 | 1 | 40 | 16 | 70 | 49 | 100 | 100 | 130 | 169 | 160 | 256 | 190 | 361 | 220 | 484 | 250 | 625 |
| 11 | 1 | 41 | 17 | 71 | 50 | 101 | 102 | 131 | 172 | 161 | 259 | 191 | 365 | 221 | 488 | 251 | 630 |
| 12 | 1 | 42 | 18 | 72 | 52 | 102 | 104 | 132 | 174 | 162 | 262 | 192 | 369 | 222 | 493 | 252 | 635 |
| 13 | 2 | 43 | 18 | 73 | 53 | 103 | 106 | 133 | 177 | 163 | 266 | 193 | 372 | 223 | 497 | 253 | 640 |
| 14 | 2 | 44 | 19 | 74 | 55 | 104 | 108 | 134 | 180 | 164 | 269 | 194 | 376 | 224 | 502 | 254 | 645 |
| 15 | 2 | 45 | 20 | 75 | 56 | 105 | 110 | 135 | 182 | 165 | 272 | 195 | 380 | 225 | 506 | 255 | 650 |
| 16 | 3 | 46 | 21 | 76 | 58 | 106 | 112 | 136 | 185 | 166 | 276 | 196 | 384 | 226 | 511 | | |
| 17 | 3 | 47 | 22 | 77 | 59 | 107 | 114 | 137 | 188 | 167 | 279 | 197 | 388 | 227 | 515 | | |
| 18 | 3 | 48 | 23 | 78 | 61 | 108 | 117 | 138 | 190 | 168 | 282 | 198 | 392 | 228 | 520 | | |
| 19 | 4 | 49 | 24 | 79 | 62 | 109 | 119 | 139 | 193 | 169 | 286 | 199 | 396 | 229 | 524 | | |
| 20 | 4 | 50 | 25 | 80 | 64 | 110 | 121 | 140 | 196 | 170 | 289 | 200 | 400 | 230 | 529 | | |
| 21 | 4 | 51 | 26 | 81 | 66 | 111 | 123 | 141 | 199 | 171 | 292 | 201 | 404 | 231 | 534 | | |
| 22 | 5 | 52 | 27 | 82 | 67 | 112 | 125 | 142 | 202 | 172 | 296 | 202 | 408 | 232 | 538 | | |
| 23 | 5 | 53 | 28 | 83 | 69 | 113 | 128 | 143 | 204 | 173 | 299 | 203 | 412 | 233 | 543 | | |
| 24 | 6 | 54 | 29 | 84 | 71 | 114 | 130 | 144 | 207 | 174 | 303 | 204 | 416 | 234 | 548 | | |
| 25 | 6 | 55 | 30 | 85 | 72 | 115 | 132 | 145 | 210 | 175 | 306 | 205 | 420 | 235 | 552 | | |
| 26 | 7 | 56 | 31 | 86 | 74 | 116 | 135 | 146 | 213 | 176 | 310 | 206 | 424 | 236 | 557 | | |
| 27 | 7 | 57 | 32 | 87 | 76 | 117 | 137 | 147 | 216 | 177 | 313 | 207 | 428 | 237 | 562 | | |
| 28 | 8 | 58 | 34 | 88 | 77 | 118 | 139 | 148 | 219 | 178 | 317 | 208 | 433 | 238 | 566 | | |
| 29 | 8 | 59 | 35 | 89 | 79 | 119 | 142 | 149 | 222 | 179 | 320 | 209 | 437 | 239 | 571 | | |
| 30 | 9 | 60 | 36 | 90 | 81 | 120 | 144 | 150 | 225 | 180 | 324 | 210 | 441 | 240 | 576 | | |

FIG. 7

DRIVE METHOD OF DISPLAY PANEL, STORAGE MEDIUM, DRIVE DEVICE AND DISPLAY DEVICE

CROSS-REFERENCE TO RELATED APPLICATION

The present application is a U.S. National Phase Entry of International Application No. PCT/CN2020/125158 having an international filing date of Oct. 30, 2020, the content of which is hereby incorporated by reference.

TECHNICAL FIELD

Embodiments of the present disclosure relate to, but are not limited to, the technical field of display, in particular to a drive method of a display panel, a storage medium, a drive device and a display device.

BACKGROUND

The Organic Light-Emitting Diode (OLED) display panel has many advantages, such as thin thickness, light weight, wide viewing angle, active light emission, continuously adjustable light emission color, low cost, fast response speed, low energy consumption, low drive voltage, wide operating temperature range, simple production process, high light emission efficiency and flexible display. It is widely applied in the display field such as mobile phones, tablet computers and digital cameras.

At present, in a process of driving an OLED panel to display images, when brightness is higher under a low grayscale, a dynamic contrast ratio characterized by the display panel will be lower. For example, when the highest brightness of an image is low (for example, half of the highest brightness in the specification) and the lowest brightness is high (for example, twice of the lowest brightness in the specification), the dynamic contrast ratio characterized by the display panel under this image is only ¼ of that in the specification.

SUMMARY

The following is a summary of subject matter described in detail herein. This summary is not intended to limit the protection scope of the claims.

In one aspect, an embodiment of the present disclosure provides a drive method of a display panel.

Herein, the display panel includes a base substrate, a pixel drive circuit, and a light-emitting element which are stacked in sequence; the light-emitting element includes a first electrode, an organic light-emitting layer, and a second electrode which are stacked in sequence, and the pixel drive circuit includes a drive transistor coupled with the first electrode, a first power supply terminal coupled with the drive transistor, and a second power supply terminal coupled with the second electrode.

The drive method includes: in an Nth frame, applying a first voltage to the second electrode and a first data signal matched with a first voltage to the first electrode through the pixel drive circuit based on grayscale data of the Nth frame; in a (N+1)th frame, applying a second voltage to the second electrode and a second data signal matched with a second voltage to the first electrode through the pixel drive circuit based on grayscale data of the (N+1)th frame, wherein the first voltage is different from the second voltage; N is a positive integer.

In another aspect, an embodiment of the present disclosure further provides a computer readable storage medium storing computer executable instructions, wherein the computer executable instructions are used for performing acts of the drive method of the display panel above.

In another aspect, an embodiment of the present disclosure further provides a drive device, which includes a memory, a processor and a computer program stored in the memory and executable on the processor, wherein acts of the drive method of the display panel above are implemented when the processor executes the program.

In another aspect, an embodiment of the present disclosure further provides a display device, including: a display panel and the drive device mentioned above.

Of course, it is not necessary to achieve all of the advantages mentioned above at the same time when any one product or method of the present disclosure is implemented. Other features and advantages of the present disclosure will be set forth in the following embodiments of the specification, or be learned by the implementations of the present disclosure. Purposes and other advantages of the embodiments of the present disclosure may be achieved and acquired by structures specified in the specification, claims and drawings.

Other aspects will become apparent upon reading and understanding drawings and the detailed description.

BRIEF DESCRIPTION OF DRAWINGS

Accompanying drawings are used to provide a further understanding of technical solutions of the present disclosure, form a part of the specification, and explain technical solutions of the present disclosure together with embodiments of the present disclosure, while they do not constitute a limitation on the technical solutions of the present disclosure. Shapes and sizes of various components in the drawings do not reflect true scales and are intended to illustrate schematically contents of the present disclosure only.

FIG. 7 is a schematic diagram of a mapping relationship between grayscales and brightnesses according to an embodiment of the present disclosure.

DETAILED DESCRIPTION

Figure 1:
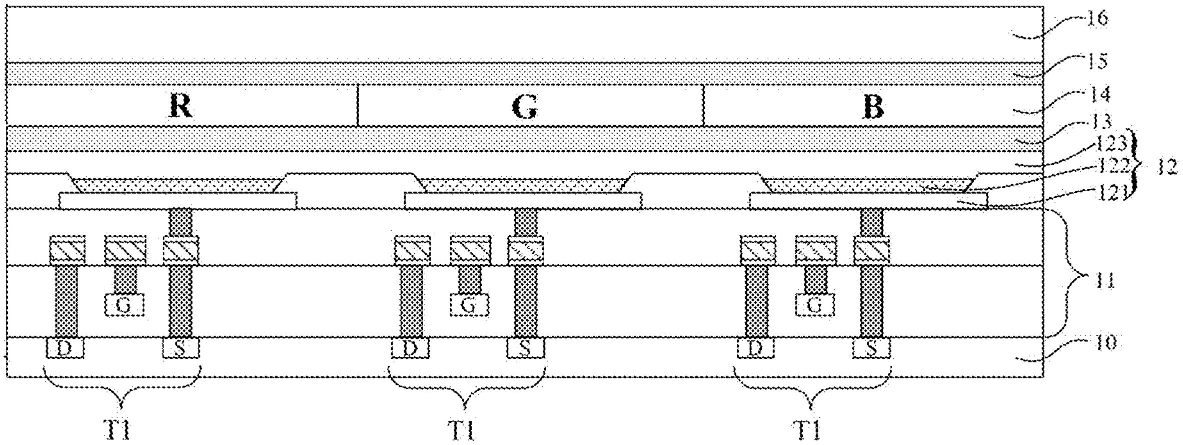
FIG. 1 is a schematic diagram of a structure of a display panel according to an embodiment of the present disclosure.

A plurality of embodiments are described in the present disclosure, but the description is exemplary rather than limiting, and there may be more embodiments and implementation solutions within the scope of the embodiments described in the present disclosure. Although many possible combinations of features are shown in the drawings and discussed in the Detailed Description, many other combinations of the disclosed features are also possible. Unless specifically limited, any feature or element of any embodiment may be used in combination with or in place of any other feature or element of any other embodiment.

When describing representative embodiments, the specification may have presented a method and/or process as a specific order of acts. However, to the extent that the method or process does not depend on the specific order of acts described herein, the method or process should not be limited to the specific order of acts described. As those of ordinary skills in the art will understand, other orders of acts are also possible. Therefore, the specific order of acts set forth in the specification should not be interpreted as limiting the claims. In addition, the claims for the method and/or process should not be limited to performing their acts in the written order, and those of skilled in the art may readily understand that these orders may vary and still remain within the spirit and scope of the embodiments of the present disclosure.

Unless otherwise defined, technical terms or scientific terms used in the embodiments of the present disclosure shall have common meanings as construed by those of ordinary skills in the art to which the present disclosure pertains. The words "first", "second" and the like used in the embodiments of the present disclosure do not represent any order, quantity or importance, but are merely used to distinguish among different components. Similar words such as "including" or "containing" mean that elements or articles appearing before the word cover elements or articles listed after the word and their equivalents, without excluding other elements or articles. Similar terms such as "connect", "couple" or "link" are not limited to physical or mechanical connections, but may include electrical connections, whether direct or indirect. For example, the term "coupled" may be used when describing some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents of the disclosure.

In the present disclosure, a transistor refers to an element that includes at least three terminals, i.e., a gate electrode (or referred to as a gate), a drain electrode, and a source electrode. The transistor has a channel area between the drain electrode (or referred to as a drain electrode terminal, a drain area or a drain) and the source electrode (or referred to as a source electrode terminal, a source area or a source), and a current may flow through the drain electrode, the channel area and the source electrode. In this disclosure, the channel area refers to an area through which a current mainly flows.

In the present disclosure, the first electrode may be a drain electrode and the second electrode may be a source electrode, or the first electrode may be a source electrode and the second electrode may be a drain electrode. In a situation where transistors with opposite polarities are used or a current direction is changed during operation of a circuit, a function of the "source electrode" and a function of the "drain electrode" may sometimes be interchangeable. Therefore, the "source electrode" and the "drain electrode" may be interchangeable in this disclosure.

In the present disclosure, an "electrical connection" includes a case where constituent elements are connected via an element having a certain electrical action. The "element with a certain electric action" is not particularly limited as long as it may transmit and receive electrical signals between the connected constituent elements. The "element with a certain electrical action" may be, for example, an electrode or wiring, a switch element such as a transistor, or other functional elements such as a resistor, an inductor or a capacitor, etc.

The following will clearly and completely describe technical solutions of the embodiments of the present disclosure with reference to the drawings of the embodiments of the present disclosure.

An embodiment of the present disclosure provides a drive method of a display panel. In practical applications, the drive method of the display panel may be applied to the display panel.

The display panel may include a base substrate, a pixel drive circuit and a light-emitting element which are stacked in sequence, wherein the light-emitting element may include a first electrode, an organic light-emitting layer and a second electrode which are stacked in sequence, and the pixel drive circuit may include a drive transistor coupled with the first electrode, a first power supply terminal coupled with the drive transistor and a second power supply terminal coupled with the second electrode.

In an exemplary embodiment, the number of light-emitting elements may be multiple, and correspondingly, the number of pixel drive circuits may be multiple. The plurality of drive circuits are respectively used for driving a plurality of light-emitting elements formed subsequently. Circuit structures and layouts of the pixel drive circuits may be designed according to actual situations, which are not limited by the embodiments of the present disclosure.

In an exemplary embodiment, a light-emitting element may include, but is not limited to, any one of an Organic Light-Emitting Diode (OLED), a Quantum Dot Light-Emitting Diode (QLED), and an Inorganic Light-Emitting Diode. For example, a light-emitting element may be a micron light-emitting element such as Micro-LED and Mini-LED.

In an exemplary embodiment, the above display panel may include, but is not limited to, an OLED display panel, a QLED display panel, etc., which is not limited by the embodiments of the present disclosure.

In an exemplary embodiment, a base substrate may be a flexible substrate or may be a rigid substrate. The flexible substrate may include a first flexible material layer, a first inorganic material layer, a semiconductor layer, a second flexible material layer and a second inorganic material layer, which are stacked. Materials of the first flexible material layer and the second flexible material layer may use materials, such as, polyimide (PI), polyethylene terephthalate (PET) or a polymer soft film with surface treatment. Materials of the first inorganic material layer and the second inorganic material layer may use materials, such as, silicon nitride (SiNx) or silicon oxide (SiOx), etc., to improve the water-resistance and oxygen-resistance of the substrate. The material of the semiconductor layer may be amorphous silicon (a-si). For example, the base substrate may be a silicon-based substrate.

In an exemplary embodiment, a first electrode may be used as an anode. For example, the first electrode may be electrically connected to a source electrode (via a connection part corresponding to a source electrode) of a drive transistor in the corresponding pixel drive circuit through a via filled with wolfram metal (i.e., W-via), or the first electrode may be electrically connected to a drain electrode.

In an exemplary embodiment, a second electrode may be used as a cathode. For example, the second electrode may be a transparent electrode. For example, the second electrode may be a common electrode, that is, a plurality of light-emitting elements share the second electrode on a whole surface.

Below, taking a light-emitting element being an OLED and a display panel being a silicon-based OLED display panel as an example, the display panel may be illustrated.

FIG. 1 is a schematic diagram of a structure of a display panel according to an embodiment of the present disclosure. For clarity and conciseness, FIG. 1 only schematically shows three light-emitting elements and one drive transistor T1 of each of three pixel drive circuits, wherein the drive transistor T1 is used for coupling with a light-emitting element formed subsequently. For example, the display panel may also include various wirings such as scan signal wires and data signal wires, which are not limited by the present disclosure.

In an exemplary embodiment, as shown in FIG. 1, the silicon-based OLED display panel may include a silicon-based substrate 10, a plurality of pixel drive circuits 11, and a plurality of light-emitting elements 12, which are stacked in sequence. Each light-emitting element 12 may include a first electrode 121 (for example, as an anode), an organic light-emitting layer 122, and a second electrode 123 (for example, as a cathode), which are stacked in sequence. Each pixel drive circuit may include a drive transistor T1 coupled with the first electrode 121, a first power supply terminal (not shown in FIG. 1) coupled with the drive transistor T1, and a second power supply terminal (not shown in FIG. 1) coupled with the second electrode 123.

In an exemplary embodiment, the second electrode 123 may be a transparent electrode. For example, the second electrode 123 may be a common electrode, that is, a plurality of light-emitting elements 12 may share the second electrode 123 on a whole surface.

In an exemplary embodiment, as shown in FIG. 1, the drive transistor T1 may include a gate electrode G, a source electrode S, and a drain electrode D. For example, the three electrodes are electrically connected to three electrode connection parts, for example, through vias filled with wolfram metal (i.e., W-vias). Accordingly, the three electrodes may be electrically connected to other electrical structures (e.g., transistors, wirings, light-emitting elements, etc.) respectively through corresponding electrode connection parts.

In an exemplary embodiment, the organic light-emitting layer of the OLED light-emitting element may include an Emitting Layer (EML), and one or more film layers of a Hole Injection Layer (HIL), a Hole Transport Layer (HTL), a Hole Block Layer (HBL), an Electron Block Layer (EBL), an Electron Injection Layer (EIL) and an Electron Transport Layer (ETL). Driven by the voltage of the anode and the cathode, light is emitted by using light emission characteristics of an organic material according to the required grayscale.

In an exemplary embodiment, the organic light-emitting layer may be prepared and formed by evaporation using a Fine Metal Mask (FMM) or an Open Mask, or by ink jet process.

In an exemplary embodiment, a silicon-based substrate and a pixel drive circuit may be manufactured through processing a monocrystalline silicon wafer by a front-end fab.

In an exemplary embodiment, as shown in FIG. 1, the silicon-based OLED display device may further include a first encapsulation layer 13, a color filter layer 14, a second encapsulation layer 15, and a cover plate 16, which are sequentially disposed on the plurality of light-emitting elements 12. For example, the first encapsulation layer 13 and the second encapsulation layer 15 may be polymer or/and ceramic film encapsulation layers, but are not limited thereto. For example, the color filter layer 14 may include a red filter unit R, a green filter unit G, and a blue filter unit B, but is not limited thereto. For example, a filter unit and a corresponding light-emitting element and pixel drive circuit may be used as a sub-pixel; for example, the red filter unit R, the green filter unit G and the blue filter unit B correspond to a red sub-pixel, a green sub-pixel and a blue sub-pixel, respectively. For example, the cover plate 16 may be a glass cover plate, but is not limited thereto.

In an exemplary embodiment, a light-emitting element including a first electrode, an organic light-emitting layer and a second electrode, a first encapsulation layer, a color filter layer, a second encapsulation layer and a cover plate may all be manufactured in a back-end panel factory.

In addition, FIG. 1 only exemplarily shows a structure of a display area (also referred to as an Active Area, AA) of the silicon-based OLED display panel. The silicon-based OLED display panel may further include a non-display area (an area other than the display area). For example, the non-display area may be further divided into a Dummy Area (DA), a Bonding Area (BA), an IC function block, etc. according to different structures and functions of various areas in the non-display area. For example, a structure of the dummy area is basically the same as that of the display area, which may be used to ensure uniformity of the display area. For example, the bonding area may include pads for electrical connection with external circuits and signal transmission. For example, the IC function block may be used for disposing a gate electrode drive circuit (for example, the gate electrode drive circuit is formed by a GOA (Gate driver On Array) technology) and circuits with other functions, etc.

Figure 2:
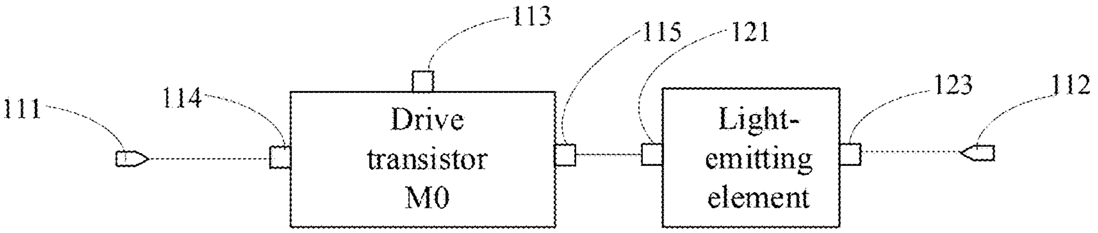
FIG. 2 is a schematic block diagram of a display panel according to an embodiment of the present disclosure.

FIG. 2 is a schematic block diagram of a display panel according to an embodiment of the present disclosure. As shown in FIG. 2, the display panel may include a pixel drive circuit and a light-emitting element. The pixel drive circuit may include a drive transistor M0, a first power supply terminal 111 and a second power supply terminal 112, the drive transistor M0 may include a gate electrode 113, a second electrode 115, and a first electrode 114 coupled with the first power supply terminal 111; and the light emitting element may include a first electrode 121 coupled with the second electrode 115 of the drive transistor M0, and a second electrode 123 coupled with the second power supply terminal 112.

In an exemplary embodiment, in addition to the drive transistor, the pixel drive circuit may further include a switch transistor, a storage capacitor, etc. For example, the pixel drive circuit may be a circuit structure such as a 3T1C circuit, a 4T1C circuit, a 5T1C circuit, a 5T2C circuit, a 6T1C circuit or a 7T1C circuit, which is not limited by the embodiments of the present disclosure.

Figure 3A:
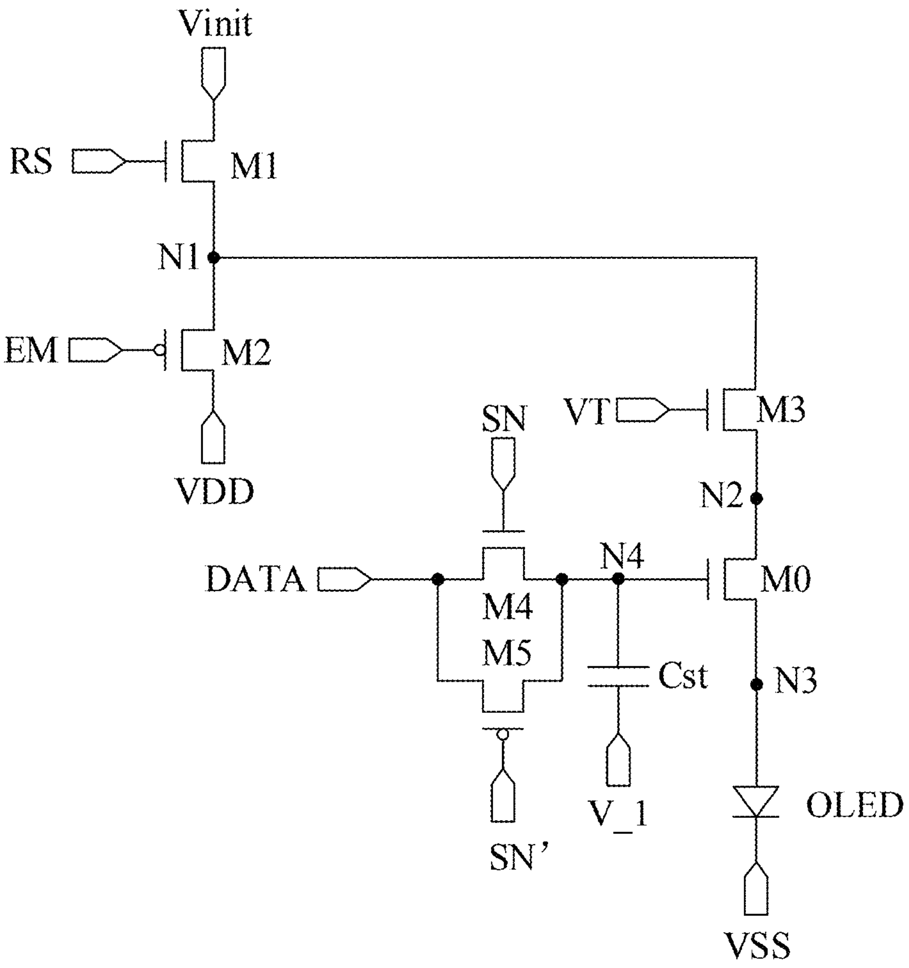
FIG. 3A is a schematic diagram of a structure of a pixel drive circuit according to an embodiment of the present disclosure.

FIG. 3A is a schematic diagram of a structure of a pixel drive circuit according to an embodiment of the present disclosure. As shown in FIG. 3A, the pixel drive circuit may include six transistors (i.e., a drive transistor M0, a first switch transistor M1, a second switch transistor M2, a third switch transistor M3, a fourth switch transistor M4, and a fifth switch transistor M5), one storage capacitor Cst, and eight signal wires (i.e., a reset control signal terminal, a reset voltage terminal, a first power supply terminal, a second power supply terminal, an emission control signal terminal, a transmission control signal terminal, a scan signal terminal and a data signal terminal). In addition, an OLED light-emitting element is also shown in FIG. 3A.

In an exemplary embodiment, as shown in FIG. 3A, a first electrode (e.g., an anode) of the OLED light-emitting element is coupled with a second electrode of the drive transistor M0, and a second electrode (e.g., a cathode) of the OLED light-emitting element is coupled with a second power supply terminal to receive a second power supply voltage VSS (i.e., a common voltage Vcom). For example, in an Nth frame, the second power supply voltage VSS (i.e., the common voltage Vcom) may be a first voltage, or in an (N+1)th frame, the second power supply voltage VSS (i.e., the common voltage Vcom) may be a second voltage.

In an exemplary embodiment, as shown in FIG. 3A, a gate of the drive transistor M0 is connected to a fourth node N4, a first electrode of the drive transistor M0 is connected to a second node N2, and a second electrode of the drive transistor M0 is connected to a third node N3. For example, as shown in FIG. 3A, the drive transistor M0 may be an N-type transistor, which is included but is not limited hereto in the embodiment of the present disclosure.

In an exemplary embodiment, as shown in FIG. 3A, a gate of the first switch transistor M1 is connected to the reset control signal terminal to receive a reset control signal RS, a first electrode of the first switch transistor M1 is connected to the reset voltage terminal to receive a reset voltage Vinit, and a second electrode of the first switch transistor M1 is connected to the first node N1. For example, as shown in FIG. 3A, the first switch transistor M1 may be an N-type transistor, which is included but is not limited hereto in the embodiment of the present disclosure. For example, the reset voltage Vinit may be a zero voltage or a ground voltage, or other fixed levels, such as low voltage, which is not limited by the embodiment of the present disclosure. For example, the N-type first switch transistor M1 is turned on when the reset control signal RS is at a high level; the N-type first switch transistor M1 is turned off when the reset control signal RS is at a low level.

In an exemplary embodiment, as shown in FIG. 3A, a gate of the second switch transistor M2 is connected to the emission control signal terminal to receive an emission control signal EM; a first electrode of the second switch transistor M2 is connected to the first power supply terminal to receive a first power supply voltage VDD, and a second electrode of the second switch transistor M2 is connected to the first node N1. For example, as shown in FIG. 3A, the second switch transistor M2 may be a P-type transistor, which is included but is not limited hereto in the embodiment of the present disclosure. For example, the P-type second switch transistor M2 is turned on when the emission control signal EM is at a low level; and the P-type second switch transistor M2 is turned off when the emission control signal EM is at a high level. For example, the first power supply voltage VDD may be a corresponding drive voltage (an analog signal) determined by actually displayed grayscale data. For example, in the Nth frame, the first power supply voltage VDD may be a corresponding drive voltage determined by the grayscale data of the Nth frame, or in the (N+1)th frame, the first power supply voltage VDD may be a corresponding drive voltage determined by processed grayscale data of the (N+1)th frame.

In an exemplary embodiment, as shown in FIG. 3A, a gate of the third switch transistor M3 is connected to the transmission control signal terminal to receive a transmission control signal VT, a first electrode of the third switch transistor M3 is connected to the first node N1, and a second electrode of the third switch transistor M3 is connected to the second node N2. For example, as shown in FIG. 3A, the third switch transistor M2 may be an N-type transistor, which is included but is not limited hereto in the embodiment of the present disclosure. For example, the N-type third switch transistor M3 is turned on when the transmission control signal VT is at a high level; and the N-type third switch transistor M3 is turned off when the transmission control signal VT is at a low level.

In an exemplary embodiment, as shown in FIG. 3A, a gate of the fourth switch transistor M4 is connected to the scan signal terminal to receive a scan signal SN, a first electrode of the fourth switch transistor M4 is connected to the data signal terminal to receive a data signal DATA (i.e., gamma voltage Gamma), a second electrode of the fourth switch transistor M4 is connected to the fourth node N4, a first terminal of the storage capacitor Cst is connected to the fourth node N4 (i.e., coupled with the gate of the drive transistor M0), and a second terminal of the storage capacitor Cst is connected to the first voltage terminal to receive a first control voltage V_1. For example, the first control voltage V_1 may be a fixed voltage, such as a zero voltage or a ground voltage. For example, the storage capacitor Cst may store the data signal DATA (i.e., gamma voltage Gamma) written to the fourth node N4 (i.e., the gate of the drive transistor M0). For example, as shown in FIG. 3A, the fourth switch transistor M4 may be an N-type transistor, which is included but is not limited hereto in the embodiment of the present disclosure. For example, the N-type fourth switch transistor M4 is turned on when the scan signal SN is at a high level; and the N-type fourth switch transistor M4 is turned off when the scan signal SN is at a low level. For example, in the Nth frame, the data signal DATA (gamma voltage Gamma) may be the first data signal, or in the (N+1)th frame, the data signal DATA (gamma voltage Gamma) may be the second data signal.

In an exemplary embodiment, as shown in FIG. 3A, a gate of the fifth switch transistor M5 is used for receiving an inverted signal SN' of the scan signal SN (for example, the scan signal SN may be input to an input terminal of an inverted circuit so as to output the inverted signal SN' at an output terminal of the inverted circuit), a first electrode of the fifth switch transistor M5 is connected to the data signal terminal to receive the data signal DATA (i.e., gamma voltage Gamma), and a second electrode of the fifth switch transistor M5 is connected to the fourth node N4. For example, the fifth switch transistor M5 and the fourth switch transistor M4 are of different types; for example, as shown in FIG. 3A, when the fourth switch transistor is an N-type transistor, the fifth switch transistor M5 is a P-type transistor.

For example, when the scan signal SN is at a high level, its inverted signal SN' is at a low level, and the P-type fifth switch transistor M5 is turned on; and when the scan signal SN is at a low level, its inverted signal SN' is at a high level, the P-type fifth switch transistor M5 is turned off. That is, the fifth switch transistor M5 and the fourth switch transistor M4 may be turned on and off at the same time. For example, the fifth switch transistor M5 and the fourth switch transistor M4 may be structurally symmetrical transistor devices; for example, the fifth switch transistor M5 and the fourth switch transistor M4 may form a Transmission Gate (also called an analog switch). For example, in the Nth frame, the data signal DATA (gamma voltage Gamma) may be the first data signal, or in the (N+1)th frame, the data signal DATA (gamma voltage Gamma) may be the second data signal.

Figure 3B:
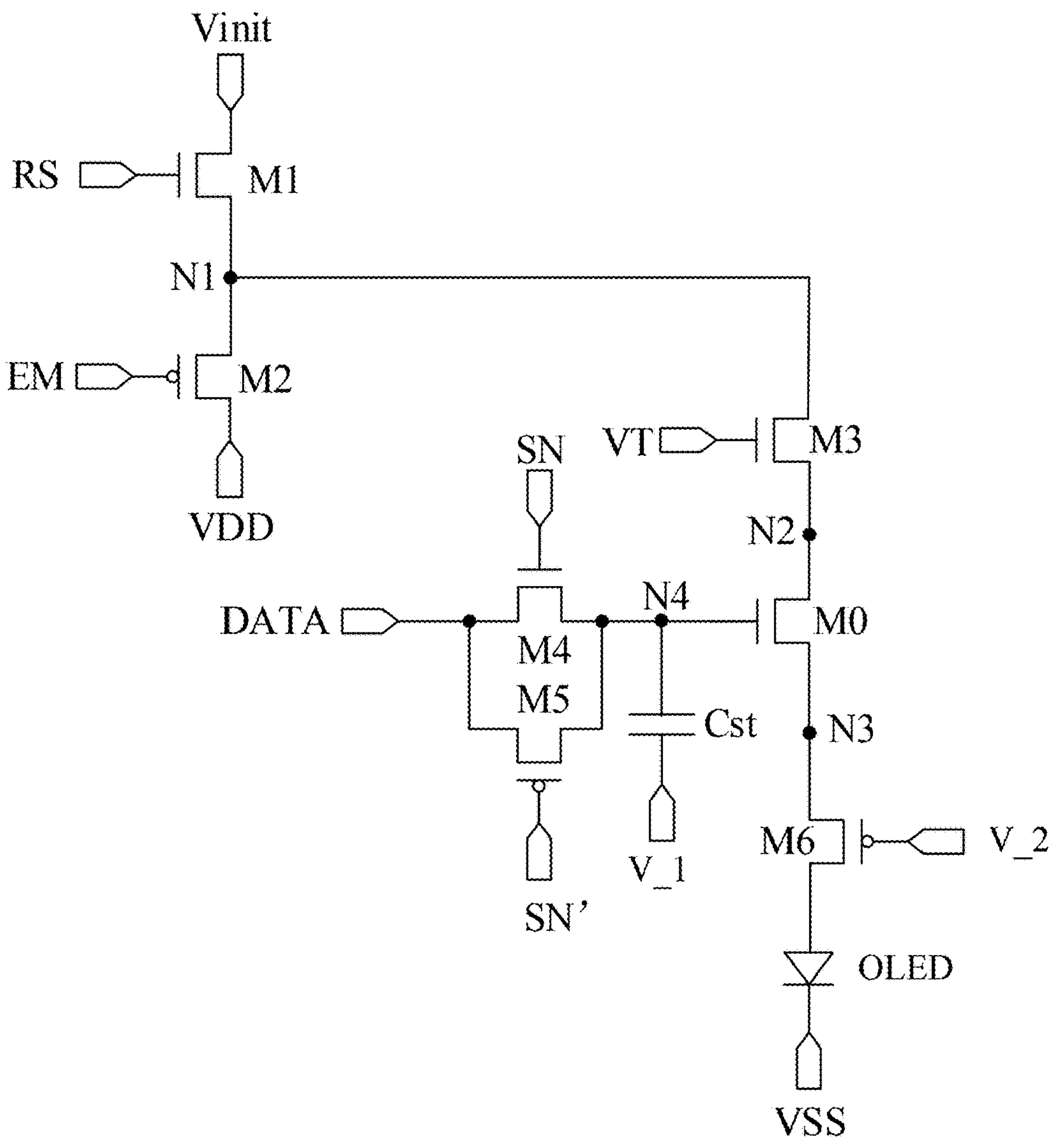
FIG. 3B is a schematic diagram of another structure of a pixel drive circuit according to an embodiment of the present disclosure.

FIG. 3B is a schematic diagram of another structure of a pixel drive circuit according to an embodiment of the present disclosure. As shown in FIG. 3B, on the basis of the pixel drive circuit shown in FIG. 3A, the pixel drive circuit shown in FIG. 3B may further include a sixth switch transistor M6. Here, other circuit structures in the pixel circuit shown in FIG. 3B (for example, the drive transistor M0, the first to fifth switch transistors M1 to M5, the storage capacitor Cst, etc.) are basically the same as those in the pixel circuit shown in FIG. 3A, which are not repeatedly described here.

In an exemplary embodiment, as shown in FIG. 3B, a gate of the sixth switch transistor M6 is connected to the second voltage terminal to receive a second control voltage V_2, a first electrode of the sixth switch transistor M6 is connected to the third node N3, a second electrode of the sixth switch transistor M6 is coupled with the first electrode (e.g., the anode) of the OLED light-emitting element, and the second electrode (e.g., the cathode) of the OLED light-emitting element is connected to the second power supply terminal to receive a second power supply voltage VSS (i.e., a common voltage Vcom). For example, as shown in FIG. 3B, the sixth switch transistor M6 may be a P-type transistor, which is included but is not limited hereto in the embodiment of the present disclosure. For example, when the sixth switch transistor M6 is a P-type transistor, the second control voltage V_2 may be a zero voltage or a ground voltage, or other fixed levels, such as a low voltage. For example, the sixth switch transistor M6 is basically kept in a turned-on state under the control of the second control voltage V_2.

In an exemplary embodiment of the present disclosure, the storage capacitor Cst may be a capacitor device manufactured by a process, for example, a capacitor device is realized by manufacturing special capacitor electrodes, each electrode of the capacitor may be realized by a metal layer, a semiconductor layer (e.g., doped polysilicon), etc. Or, the capacitor may be a parasitic capacitance between various devices, which may be realized by a transistor itself and other devices and wires. Connection modes of the capacitor are not limited to the ones described above, or may be other applicable connection modes as long as a level of a corresponding node can be stored.

In an exemplary embodiment of the present disclosure, the first node N1, the second node N2, the third node N3, and the fourth node N4 do not have to represent components that actually exist, but represent junctions of related electrical connections in the circuit diagram.

A drive method of the display panel according to an embodiment of the present disclosure will be described in detail below with reference to the display panel shown in FIG. 2.

Figure 4:
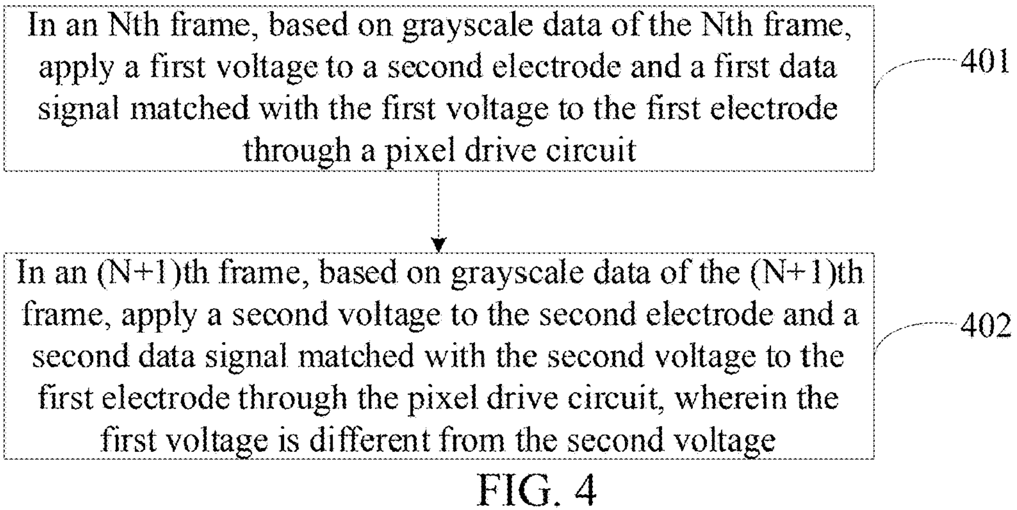
FIG. 4 is a schematic flowchart of a drive method of a display panel according to an embodiment of the disclosure.

FIG. 4 is a schematic flowchart of a drive method of a display panel according to an embodiment of the present disclosure. As shown in FIG. 4, the drive method may include the following acts 401 to 402.

In act 401, in an Nth frame, based on grayscale data of the Nth frame, a first voltage is applied to a second electrode through a pixel drive circuit, and a first data signal matched with the first voltage is applied to the first electrode; wherein N is a positive integer.

In act 402, in an (N+1)th frame, a second voltage is applied to the second electrode and a second data signal matched with the second voltage is applied to the first electrode through the pixel drive circuit based on grayscale data of the (N+1)th frame, wherein the first voltage is different from the second voltage.

In this way, according to the drive method of the display panel provided by the embodiment of the present disclosure, the voltages of the display panel are adjusted (including the voltage applied to the second electrode of the display panel and the data signal applied to the first electrode of the display panel are adjusted) through the pixel drive circuit based on the grayscale data of different images, so that different drive modes can be adopted for the display panel according to different images, and thus the dynamic contrast ratio of the display panel can be increased.

In an exemplary embodiment, when a second electrode serves as a common cathode, a voltage applied to the second electrode may be a low voltage. For example, the first voltage or the second voltage may be a low voltage.

In an exemplary embodiment, an absolute value of the first voltage may be larger than an absolute value of the second voltage when a highest grayscale of the Nth frame is larger than a highest grayscale of the (N+1)th frame (that is, the absolute value of the second voltage may be less than the absolute value of the first voltage when the highest grayscale of the (N+1)th frame is less than the highest grayscale of the Nth frame). In this way, when displaying a lower grayscale, a light-emitting element may have a lower emission brightness by reducing the voltage applied to the second electrode, so that the brightness of the low grayscale can be greatly reduced and the dynamic contrast ratio of the display panel can be improved, and in addition, the power consumption of the display panel can be reduced.

In an exemplary embodiment, an absolute value of the first voltage may be larger than an absolute value of the second voltage when a lowest grayscale of the Nth frame is larger than a lowest grayscale of the (N+1)th frame (that is, the absolute value of the second voltage may be less than the absolute value of the first voltage when the lowest grayscale of the (N+1)th frame is less than the lowest grayscale of the Nth frame). In this way, when displaying a lower grayscale, a light-emitting element may have a lower emission brightness by reducing the voltage applied to the second electrode, so that the brightness of the low grayscale can be greatly reduced and the dynamic contrast ratio of the display panel can be improved, and in addition, the power consumption of the display panel can be reduced.

In an exemplary embodiment, for a pixel with the same grayscale in the Nth frame and the (N+1)th frame, a data signal provided to the pixel in the first data signal may be different from a data signal provided to the pixel in the second data signal. In this way, when the voltage applied to the second electrode is adjusted and the data signal applied to the first electrode is adjusted at the same time, the grayscale brightness may be re-matched, thus forming a display effect with a high dynamic contrast ratio.

In an exemplary embodiment, for a pixel with the same grayscale in the Nth frame and the (N+1)th frame, when the highest grayscale of the Nth frame is greater than the highest grayscale of the (N+1)th frame, the voltage of the data signal provided to the pixel in the first data signal may be smaller than that of the data signal provided to the pixel in the second data signal. In this way, when displaying a lower grayscale, a light-emitting element may have a lower emission brightness by reducing the voltage of the data signal applied to the first electrode, so that the brightness of the low grayscale can be greatly reduced and the dynamic contrast ratio of the display panel can be improved.

In an exemplary embodiment, for a pixels with the same grayscale in the Nth frame and the (N+1)th frame, when the lowest grayscale of the Nth frame is greater than the lowest grayscale of the (N+1)th frame, the voltage of the data signal provided to the pixel in the first data signal may be smaller than that of the data signal provided to the pixel in the second data signal. In this way, when displaying a lower grayscale, a light-emitting element may have a lower emission brightness by reducing the voltage of the data signal applied to the first electrode, so that the brightness of the low grayscale can be greatly reduced and the dynamic contrast ratio of the display panel can be improved.

In an exemplary embodiment, an absolute value of the first voltage is not higher than that of a standard common voltage, and an absolute value of the second voltage is not higher than that of the standard common voltage, wherein the standard common voltage is a voltage of the second electrode when a white image is displayed. In this way, since the absolute values of the first voltage and the second voltage are not higher than the absolute value of the standard common voltage, the power consumption of the display panel can be reduced.

In an exemplary embodiment, a voltage of the first data signal is not less than a standard gamma voltage, and a voltage of the second data signal is not less than the standard gamma voltage, wherein the standard gamma voltage is a voltage of the first electrode when a white image is displayed. In this way, a dynamic contrast ratio can be improved.

Hereinafter, taking the display panel shown in FIG. 2 as an example and referring to the circuit structure of the pixel drive circuit shown in FIG. 3A, the drive method of the display panel according to the embodiment of the present disclosure will be described in detail.

Figures 5, 6:
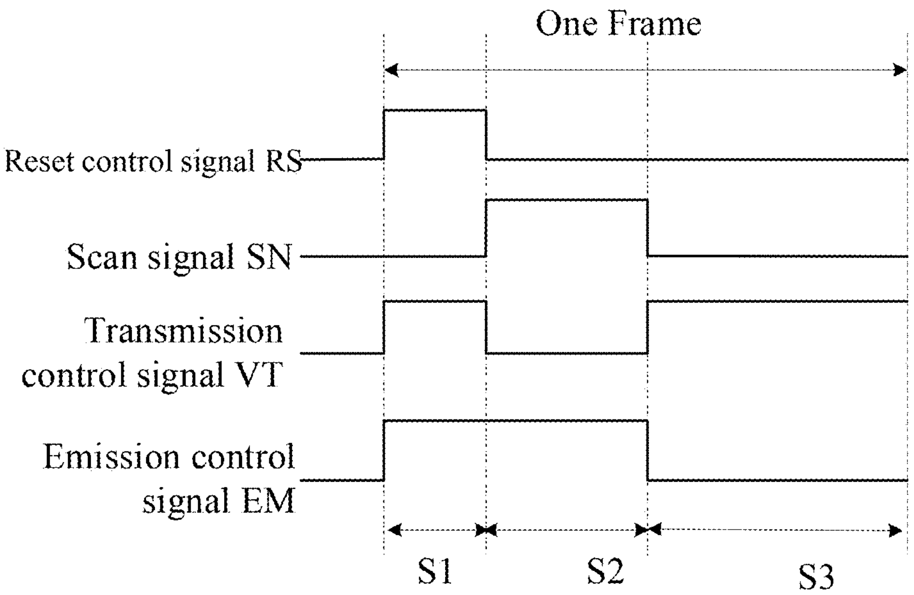
FIG. 5 is a schematic diagram of a frame according to an embodiment of the present disclosure.
FIG. 6 is a schematic diagram of geometric position marks of pixels according to an embodiment of the present disclosure.

In an exemplary embodiment, as shown in FIG. 5, a drive process of one frame period may include a reset stage S1, a data writing stage S2 and a light emission stage S3. A timing waveform of each control signal (including a reset control signal RS, a scan signal SN, a transmission control signal VT and a emission control signal EM) in each stage is shown in FIG. 5.

In the reset stage S1, a reset control signal RS and a transmission control signal VT are input and a reset voltage Vinit is applied to a first electrode of a light-emitting element. Then, the first electrode (e.g., the anode) of the OLED light-emitting element is connected to the reset voltage Vinit, and the second electrode (e.g., the cathode) of the OLED light-emitting element is connected to the second power supply voltage VSS (i.e., common voltage Vcom) through the pixel drive circuit, so that the light-emitting element is reset.

In an exemplary embodiment, when a reset control signal RS and a transmission control signal VT are input, an N-type first switch transistor M1 is turned on by a high level of the reset control signal RS, and an N-type third switch transistor M3 is turned on by a high level of the transmission control signal VT; at the same time, a P-type second switch transistor M2 is turned off by a high level of the emission control signal EM, an N-type fourth switch transistor M4 is turned off by a low level of the scan signal SN, and correspondingly, a P-type fifth switch transistor M5 is turned off by a high level of the inverted signal SN' of the scan signal SN. In addition, a drive transistor M0 is turned on by a level of the fourth node N4 (i.e., the data signal DATA stored in the storage capacitor Cst during the display of the previous frame).

In the data writing stage S2, a scan signal SN is input, a data signal DATA (i.e., gamma voltage Gamma) is written to a gate of the drive transistor, and the written data signal DATA is stored by the storage capacitor Cst. For example, in an Nth frame, the data signal DATA (gamma voltage Gamma) may be a first data signal, or in an (N+1)th frame, the data signal DATA (gamma voltage Gamma) may be a second data signal.

In an exemplary embodiment, an N-type fourth switch transistor M4 is turned on by a high level of the scan signal SN, and correspondingly, a P-type fifth switch transistor M5 is turned on by a low level of the inverted signal SN' of the scan signal SN; at the same time, an N-type first switch transistor M1 is turned off by a low level of the reset control signal RS, a P-type second switch transistor M2 is turned off by a high level of the emission control signal EM, and an N-type third switch transistor M3 is turned off by a low level of the transmission control signal VT. In this way, the data signal DATA charges a first terminal of the storage capacitor Cst (i.e., the fourth node N4, also a gate of the drive transistor M0), so that a potential of the first terminal of the storage capacitor Cst becomes the data signal DATA, and the drive transistor M0 is kept in a turned-on state under the control of the data signal DATA. In this way, after the data writing stage S2, the potential at the first terminal of the storage capacitor Cst (i.e., the fourth node N4, also the gate of the drive transistor M0) is the data signal DATA, that is, voltage information of the data signal DATA is stored in the storage capacitor Cst for controlling the drive transistor M0 to generate a drive current in the subsequent light emission stage S3.

In the light emission stage S3, the first power supply voltage VDD is applied to a first electrode of the drive transistor, so that the drive transistor controls a voltage Vs of the second electrode of the drive transistor according to the data signal DATA (i.e., the gamma voltage Gamma) of the gate of the drive transistor and the first power supply voltage VDD of the first electrode of the drive transistor, and generates a drive current based on the voltage Vs of the second electrode of the drive transistor to drive the OLED light-emitting element to emit light. In this way, the first electrode of the OLED light-emitting element is connected to the data signal DATA (i.e., gamma voltage Gamma), and the second electrode of the OLED light-emitting element is connected to the second power supply voltage VSS (i.e., the common voltage Vcom) through the pixel drive circuit, so that the OLED light-emitting element may emit light under the action of the drive current flowing through the drive transistor M0. For example, in the Nth frame, the second power supply voltage VSS (i.e., the common voltage Vcom) may be a first voltage and the data signal DATA (i.e., the gamma voltage Gamma) may be a first data signal, or in the (N+1)th frame, the second power supply voltage VSS may be a second voltage and the data signal Data may be a second data signal. For example, in the Nth frame, the first power supply voltage VDD may be a corresponding drive voltage determined by grayscale data of the Nth frame, or in the (N+1)th frame, the first power supply voltage VDD may be a corresponding drive voltage determined by processed grayscale data of the (N+1)th frame.

In an exemplary embodiment, the emission control signal EM and the transmission control signal VT are input, a P-type second switch transistor M2 is turned on by a low level of the emission control signal EM, and an N-type third switch transistor M3 is turned on by a high level of the transmission control signal VT; at the same time, an N-type first switch transistor M1 is turned off by a low level of the reset control signal RS, an N-type fourth switch transistor M4 is turned off by a low level of the scan signal SN, and correspondingly, a P-type fifth switch transistor M5 is turned off by a high level of the inverted signal SN' of the scan signal. In addition, the drive transistor M0 is turned on by a level of the fourth node N4 (i.e., the voltage of the data signal DATA stored in the storage capacitor Cst in the data writing stage S2). In this way, the first electrode of the OLED light-emitting element is connected to the data signal DATA (i.e., the gamma voltage Gamma), and the second electrode of the OLED light-emitting element is connected to the second power supply voltage VSS (i.e., the common voltage Vcom) through the pixel drive circuit, so that the OLED light-emitting element may emit light under the action of the drive current flowing through the drive transistor M0.

In an exemplary embodiment, a reset stage may be last few timings of a frame period or first few timings of a frame period. For example, a frame period may include 9 timings from 0 to 8, and the reset stage S1 may be a duration represented by timings from 0 to 1, or a duration represented by timings from 7 to 8. Of course, the reset stage may be another duration, and may be set by a person skilled in the art according to actual situations, which is not limited hereto in the embodiment of the present disclosure.

The signal timing diagram shown in FIG. 5 is schematic. As for the display substrate provided by the embodiment of the present disclosure, the signal timing during the operation may be determined according to actual needs, which is not limited hereto in the embodiment of the present disclosure.

In an exemplary embodiment, a case in which at least one of the Nth frame and the (N+1)th frame may include a reset stage is taken as an example, a data writing stage and a light-emitting stage, the drive method may further include at least one of the following acts 403 and 404.

In act 403, in the reset stage of the Nth frame, a reset voltage is applied to the first electrode through the pixel drive circuit.

In act 404, in the reset stage of the (N+1)th frame, a reset voltage is applied to the first electrode through the pixel drive circuit.

In an exemplary embodiment, the reset voltage may be a low voltage, such as a ground voltage or a zero voltage, which is not limited hereto in the embodiment of the present disclosure.

In this way, at the reset stage (such as an end time or a start time) in one frame period, a reset voltage Vinit is applied to the first electrode through the pixel drive circuit, so that the light-emitting element is reset (for example, for an exemplary implementation, reference may be made to the foregoing description about the reset stage S1, which will not be repeatedly described here). Therefore, poor display phenomena such as defected images caused by accumulation of residual charges of the previous frame may be avoided, and further, a dynamic contrast ratio and a display effect of the display panel can be improved.

In an exemplary embodiment, the drive method may further include the following act 405.

In act 405, a blank frame is inserted between the Nth frame and the (N+1)th frame, and in the blank frame, the voltage signal applied to the second electrode is switched from the first voltage to a third voltage through the pixel drive circuit. An absolute value of the third voltage is smaller than that of the first voltage, and the absolute value of the third voltage is smaller than that of the second voltage. In this way, poor display phenomena such as defective images caused by accumulation of residual charges in a previous frame (e.g., the Nth frame) of two adjacent frames may be prevented from affecting a display effect of a next frame (e.g., the N+1 frame), thereby a dynamic contrast ratio and a display effect of the display panel can be further improved.

In an exemplary embodiment, the third voltage may be a zero voltage. Thereby, the first voltage may be a level less than 0, and the second voltage may be a level less than 0.

In an exemplary embodiment, the drive method may further include the following act 406.

In act 406, in the blank frame, an electrical connection between the first power supply terminal and the drive transistor is cut off. In this way, the power supply voltage output by the first power supply terminal cannot be applied to the drive transistor, so that the light-emitting element stops emitting light in the blank frame. In this way, poor display phenomena such as defective images caused by accumulation of residual charges of a previous frame (e.g., the Nth frame) of the blank frame can be avoided, thereby further improving the dynamic contrast ratio and the display effect. In addition, the power consumption of the display panel can be reduced.

In an exemplary embodiment, as shown in FIG. 5, after the light emission stage S3 of the Nth frame lasts for a time duration, an input of the transmission control signal VT may be stopped (other control signals remain in the state in the light emission stage S3), for example, the transmission control signal VT changes from a high level to a low level, so that the third switch transistor M3 is turned off, thus an electrical connection between the first power supply terminal and the drive transistor is disconnected, and the first power supply voltage VDD cannot be applied to a first electrode of the drive transistor M0, the drive transistor M0 cannot generate a drive current, and the OLED light-emitting element stops emitting light.

Of course, cutting off the electrical connection between the first power supply terminal and the drive transistor may also be realized by other ways, which is not limited to the way mentioned above. For example, it may be realized by controlling whether to input the emission control signal EM, or by controlling whether to input the emission control signal EM and the transmission control signal VT, which is not limited thereto in the embodiment of the present disclosure.

Hereinafter, taking the (N+1)th frame as an example, how to determine a second data signal applied to the first electrode and a second voltage applied to the second electrode through the pixel drive circuit based on grayscale data of the (N+1)th frame will be explained.

In an exemplary embodiment, act 402 may include the following acts 4021 to 4025.

In act 4021, a first grayscale is determined based on the grayscale data of the (N+1)th frame.

In an exemplary embodiment, the act 4021 may include but is not limited to the following three modes.

Mode 1: a highest grayscale is determined from the grayscale data of the (N+1)th frame, and is determined as a first grayscale.

For example, assuming that the grayscale data of the (N+1)th frame is between G0 and Gmax, and Gmax is the highest grayscale, then Gmax may be determined as the first grayscale.

In an exemplary embodiment, a process of reading the highest grayscale GL in the grayscale data of the (N+1)th frame through an image algorithm may be as follows.

a). Marking a geometric position of each pixel in a whole image of the (N+1)th frame, such as (x1,y1), (x2,y2), . . . , (xn,yn). FIG. 6 is a schematic diagram of geometric position marks of pixels when n=25 is used as an example.

b) Moving to the marks (x1,y1)->(xn,yn) in turn to look up a global maximum (the highest grayscale) in the (N+1)th frame. A process of looking up the highest grayscale may include the following acts 1) to 4).

In act 1), a grayscale of (x1,y1) is recorded into A.

In act 2), a grayscale of (x2,y2) is recorded into B.

In act 3), it is to compare A with B to get a larger value and record it into A.

In act 4), the above process from act 1) to act 3) is repeated until a point (xm,ym) with a largest grayscale is obtained through comparison, and a grayscale of the point (xm,ym) is recorded as the highest grayscale GL.

Mode 2: the highest X grayscales are determined from the grayscale data of the (N+1)th frame; a mean value of the highest X grayscales is determined as a first grayscale; wherein X is a positive integer greater than 1.

For example, taking X=3 as an example, assuming that the highest first three grayscales of the grayscale data of the (N+1)th frame are Gmax1, Gmax2 and Gmax3 respectively, the mean value Gmean of Gmax1, Gmax2 and Gmax3 may be determined as the first grayscale. Wherein, Gmean=(Gmax1+Gmax2+Gmax3)/3.

Mode 3: a grayscale in a preset area is determined from the grayscale data of the (N+1)th frame; and a highest grayscale among the grayscales in the preset area is determined as a first grayscale.

For example, assuming the grayscale data of the (N+1)th frame is between G0 and Gmax, and Gmax is the highest grayscale, and the image of the (N+1)th frame contains a person P, the preset area may refer to an area where the person P is located. Assuming that the grayscale data of the area where the person P is located in the grayscale data of the (N+1)th frame is between G0 and Gp, and Gp is the highest grayscale in the area where the person P is located, then Gp may be determined as the first grayscale.

In an exemplary embodiment, a preset area may be an area where a target object is located, such as a target person, a target object, etc. Alternatively, a preset area may be a center area of an image with a preset size in the (N+1)th frame. Of course, a preset area may be other areas, which may be determined by a person skilled in the art according to actual situations, which is not limited by the embodiment of the present disclosure.

In an exemplary embodiment, the number of preset areas may be one or more. It may be determined by a person skilled in the art according to actual situations, which is not limited by the embodiment of the present disclosure.

In act 4022, a first emission brightness corresponding to the first grayscale is determined according to a first mapping relationship established in advance.

The first mapping relationship is used for describing a relationship between grayscales and emission brightnesses when the display panel is driven by applying a standard common voltage to the second electrode and a standard gamma voltage to the first electrode. The standard common voltage is a voltage of the second electrode measured through adjusting optical parameters when a white image is displayed in a debugging stage of the display module of the display panel. The standard gamma voltage is a voltage of the first electrode when a white image is displayed under the standard gamma value obtained by adjusting optical parameters in the debugging stage of the display module of the display panel.

In an exemplary embodiment, in a debugging stage of the display module of the display panel, the standard common voltage (standard Vcom) and the standard Gamma voltage (standard Gamma) are obtained by debugging optical parameters, and different emission brightness corresponding to different grayscales under the standard Vcom and the standard gamma are recorded at the same time, so that a data table A1 shown in FIG. 7 (i.e., the above first mapping relationship) may be obtained. Then, when a corresponding first grayscale is obtained according to grayscale data of a frame, a first emission brightness corresponding to the first grayscale may be obtained by looking up the first mapping relationship.

In act 4023, whether there is a mapping relationship matched with the first emission brightness in at least one second mapping relationship established in advance is determined.

The second mapping relationship is used for describing a mapping relationship among a candidate common voltage, emission brightness and a candidate gamma voltage.

If there is a mapping relationship matched with the first emission brightness in at least one second mapping relationship established in advance, act 4024 may be executed to drive a light-emitting element with an adjusted drive voltage. Alternatively, if there is no mapping relationship matched the first emission brightness in at least one second mapping relationship established in advance, act 4025 may be executed to drive a light-emitting element with a standard drive voltage.

In act 4024, the candidate common voltage in the matched mapping relationship is applied to the second electrode as a second voltage, and the candidate gamma voltage in the matched mapping relationship is applied to the first electrode as a second data signal.

In act 4025, the standard common voltage is applied to the second electrode as a second voltage, and the standard gamma voltage is applied to the first electrode as a second data signal.

In an exemplary embodiment, act 4023 may include the following acts 4023*a* to 4023*d*.

In act 4023*a*, the first emission brightness is compared with emission brightnesses of the at least one second mapping relationship.

The second mapping relationship is used for describing a mapping relationship among the candidate common voltage, the emission brightness and the candidate gamma voltage.

In act 4023*b*, whether there is a second emission brightness matched with the first emission brightness in the emission brightnesses of the at least one second mapping relationship is determined according to a comparison result.

If there is the second emission brightness matched with the first emission brightness in the emission brightnesses of the at least one second mapping relationship, act 4023*c* may be executed. If there is no second emission brightness matched with the first emission brightness in the emission brightnesses of the at least one second mapping relationship, act 4023*d* may be executed.

In act 4023*c*, it is determined that there is a mapping relationship matched with the first emission brightness value in the at least one second mapping relationship.

In act 4023*d*, it is determined that there is no mapping relationship matched with the first emission brightness value in the at least one second mapping relationship.

In an exemplary embodiment, the act 4023*b* may include but is not limited to the following three cases.

Case 1: if a first emission brightness is less than a minimum emission brightness in emission brightnesses of at least one second mapping relationship, it is determined that there is the second emission brightness matched with the first emission brightness in the emission brightnesses of the at least one second mapping relationship, wherein the second emission brightness is the minimum emission brightness.

Case 2: if a first emission brightness is less than a maximum emission brightness in emission brightnesses of at least one second mapping relationship and not less than other emission brightness except the maximum emission brightness in the emission brightnesses of at least one second mapping relationship, it is determined that there is the second emission brightness matched with the first emission brightness value in the emission brightnesses of the at least one second mapping relationship, wherein the second emission brightness is the maximum emission brightness.

Case 3: if the first emission brightness is in a light emission interval formed by two adjacent emission brightnesses in emission brightnesses of at least one second mapping relationship, it is determined that there is the second emission brightness matched with the emission brightness in the emission brightnesses of the at least one second mapping relationship, wherein the second light emission is the emission brightness corresponding to a larger terminal of the light emission interval.

In an exemplary embodiment, in a debugging stage of the display module of the display panel, by adjusting different common voltages Vcom (i.e., second power supply voltages VSS applied to the second electrode of the light-emitting element), different matched gamma voltages Gamma (i.e., data signals Data applied to the first electrode of the light-emitting element) and corresponding different highest brightnesses are obtained, so that a match table A2 as shown in the table 1 below (i.e., the second mapping relationship mentioned above) may be obtained. Herein, Vcom1, Vcom2 and Vcom3 are less than the standard vcom; L1 is less than L2, and L2 is less than L3.

TABLE 1

| Common voltage | Gamma voltage | Maximum brightness |
|---|---|---|
| Vcom1 | Gamma1 | L1 |
| Vcom2 | Gamma2 | L2 |
| Vcom3 | Gamma3 | L3 |

For example, taking the second mapping relationship shown in Table 1 above as an example, the drive method will be explained. After determining the first emission brightness corresponding to the first grayscale according to the preset first mapping relationship, it is judged whether the first emission brightness is less than L1. If the first emission brightness is less than L1, it is indicated that there is a second emission brightness matched with the first emission brightness in emission brightnesses of the second mapping relationship (at this time, the second emission brightness is L1), Vcom1 may be applied to the second electrode and Gamma1 corresponding to Vcom1 may be applied to the first electrode through the pixel drive circuit. If the first emission brightness is not less than L1, it may be judged whether the first emission brightness is less than L2; then, if the first emission brightness is less than L2, it is indicated that there is the second emission brightness matched with the first emission brightness in emission brightnesses of the second mapping relationship (at this time, the second emission brightness is L2), Vcom2 may be applied to the second electrode and Gamma2 corresponding to Vcom2 may be applied to the first electrode through the pixel drive circuit. If the first emission brightness is not less than L2, it is judged whether the first emission brightness is less than L3; then, if the first emission brightness is less than L3, it is indicated that there is the second emission brightness matched with the first emission brightness in emission brightnesses of the second mapping relationship (at this time, the second emission brightness is L3), Vcom3 may be applied to the second electrode and Gamma3 corresponding to Vcom3 may be applied to the first electrode through the pixel drive circuit. If the first light emission is not less than L3, it is indicated that there is no second light emission matched with the first light emission in emission brightnesses of the second mapping relationship, the standard Vcom may be applied to the second electrode and the standard Gamma may be applied to the first electrode through the pixel drive circuit.

In an exemplary embodiment, act 402 may further include the following acts 4026 to 4028.

In act 4026, a second grayscale corresponding to the emission brightness in a matched mapping relationship is determined according to a third mapping relationship established in advance.

The third mapping relationship is used for describing a relationship between grayscales and emission brightnesses when the display panel is driven by a candidate common voltage and candidate gamma voltage in the matched mapping relationship.

In an exemplary embodiment, in a debugging stage of the display module of the display panel, a candidate common voltage (different from the standard Vcom) and a candidate gamma voltage (different from the standard Gamma) are obtained by debugging optical parameters, and different emission brightnesses corresponding to different grayscales under the candidate common voltage (candidate Vcom) and the candidate gamma voltage (candidate gamma) are recorded at the same time, so that a third mapping relationship may be obtained (similar to Table 1, only the drive voltage is different, so the detail will not be further illustrated here). Then, after it is determined that there is a mapping relationship matched with the first emission brightness in at least one second mapping relationship established in advance, a second grayscale corresponding to an emission brightness in the matched mapping relationship (i.e., the second emission brightness mentioned above) may be obtained by looking up the third mapping relationship according to the emission brightness in the matched mapping relationship (i.e., the second emission brightness mentioned above).

In act 4027, the grayscale data of the (N+1)th frame is multiplied by a ratio between the first grayscale and the second grayscale to obtain processed grayscale data of the (N+1)th frame.

In act 4028, the drive voltage corresponding to the processed grayscale data of the (N+1)th frame is applied to the drive transistor.

In an exemplary embodiment, as shown in FIG. 3A, the corresponding drive voltage (i.e., a first power supply voltage VDD) determined by the processed grayscale data of the (N+1)th frame is applied to a first electrode of the drive transistor, so that the drive transistor controls a voltage Vs of a second electrode of the drive transistor according to the data signal DATA (i.e., a gamma voltage Gamma) of the gate of the drive transistor and the first power supply voltage VDD of the first electrode of the drive transistor, and generates a drive current based on the voltage Vs of the second electrode of the drive transistor to drive the OLED light-emitting element to emit light.

For example, the implementation of determining a first data signal applied to the first electrode and a first voltage applied to the second electrode through the pixel drive circuit based on the grayscale data of the Nth frame is similar to that of determining a second data signal applied to the first electrode and a second voltage applied to the second electrode through the pixel drive circuit based on the grayscale data of the (N+1)th frame. Please refer to the relevant descriptions in the embodiments of the present disclosure for understanding, and the detail will not be repeated here.

With the drive method of the display panel in the embodiment of the present disclosure, in the Nth frame, a first voltage may be applied to the second electrode and a first data signal matched with the first voltage may be applied to the first electrode through the pixel drive circuit based on the grayscale data of the Nth frame, wherein N is a positive integer. In the (N+1)th frame, a second voltage may be applied to the second electrode and a second data signal matched with the second voltage may be applied to the first electrode through the pixel drive circuit based on the grayscale data of the (N+1)th frame, wherein the first voltage is different from the second voltage. In this way, by applying different voltages to a second electrode (e.g., a cathode) of a light-emitting element in different frames, and applying a data signal matched with a voltage of the second electrode to a first electrode (e.g., an anode) of the light-emitting element, different drive modes may be adopted for the display panel according to different frames, so that brightness of the low grayscale can be reduced, and the dynamic contrast ratio of the display panel can be improved.

Figure 8A:
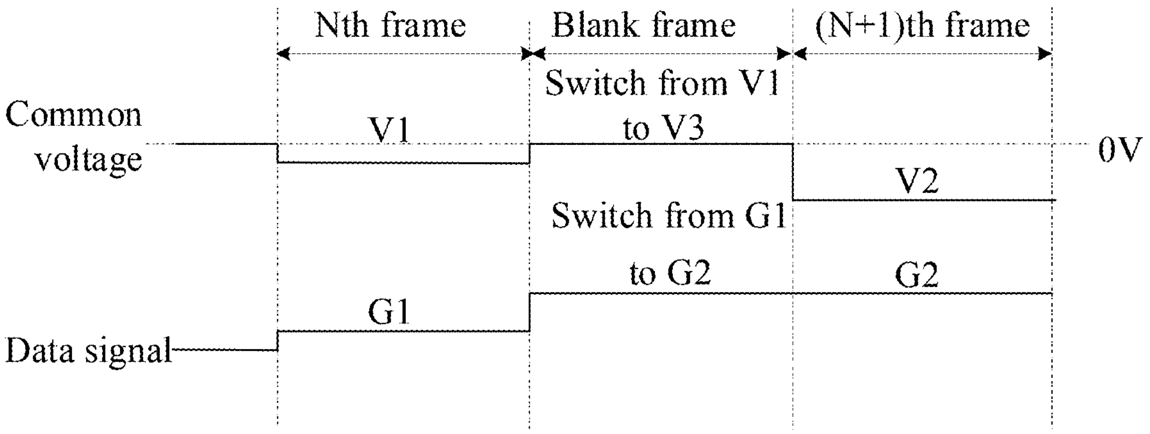
FIG. 8A is a signal timing diagram of a drive method of a display panel according to an embodiment of the present disclosure.
Figure 8B:
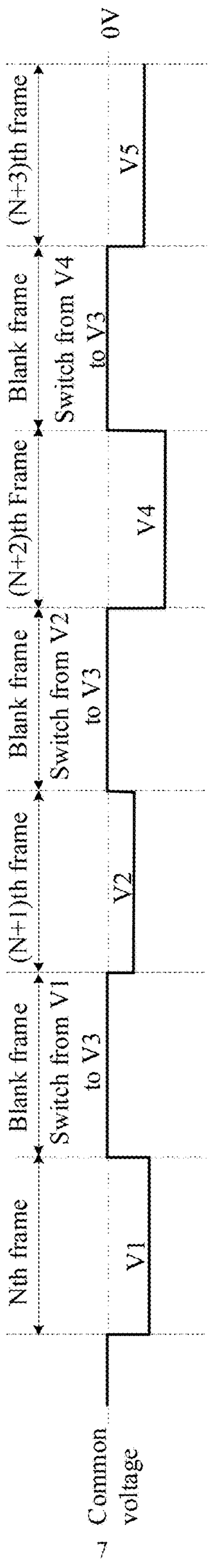
FIG. 8B is another signal timing diagram of a drive method of a display panel according to an embodiment of the present disclosure.

FIG. 8A is a signal timing diagram of a drive method of a display panel according to an embodiment of the present disclosure; FIG. 8B is another signal timing diagram of a drive method of a display panel according to an embodiment of the present disclosure. Here, values of voltages of the signal timing diagrams shown in FIGS. 8A and 8B are only schematic, which do not represent true voltage values or relative proportions.

Below, taking the (N+1)th frame as an example, a drive method of a display panel according to an embodiment of the present disclosure will be described with reference to the signal timing diagrams shown in FIGS. 8A and 8B.

In act 1, a highest grayscale GL (i.e., the first grayscale mentioned above) in the grayscale data of the (N+1)th frame is read through an image algorithm.

For example, a process of reading the highest grayscale GL may be as follows.

a1) Marking a geometric position of each pixel in a whole image of the (N+1)th frame, such as (x1,y1), (x2,y2), . . . , (xn,yn).

b1) Moving to the marks (x1,y1)->(xn,yn) in turn to look up a global maximum (the highest grayscale) in the (N+1)th frame. A process of looking up the global maximum may include the following acts 11) to 14).

In act 11), a grayscale of (x1,y1) is recorded into A.

In act 12), a grayscale of (x2,y2) is recorded into B.

In act 13), it is to compare A with B to get a larger value and record it into A.

In act 14), the above process from act 1) to act 3) is repeated until a point (xm,ym) with a largest grayscale is obtained through comparison, and a grayscale of the point (xm,ym) is recorded as the highest grayscale GL.

In act 2, a highest brightness L output by a product (i.e., first emission brightness corresponding to the first grayscale mentioned above) is reversely looked up by using the highest grayscale GL.

A process of looking up the highest brightness L may be as follows.

a2). In a debugging stage of the display module of the display panel, according to debugging requirements, a standard common voltage (standard Vcom) and a standard gamma voltage (standard Gamma) are obtained by debugging optical parameters of the display module. At the same time, when the display panel is driven through the standard Vcom and the standard Gamma, each grayscale and its corresponding module brightness (i.e., the emission brightness mentioned above) are recorded, so that the data table A1 shown in FIG. 7 (i.e., the first mapping relationship mentioned above) may be obtained using different grayscales and their corresponding emission brightnesses under the standard Vcom and the standard Gamma.

b2). Data table A1 is reversely looked up according to the highest grayscale GL obtained in act 1, as a result the highest brightness L to be output by the product may be obtained.

In act 3, a best Vcom (i.e., the second voltage mentioned above) and a best Gamma (i.e., the first data signal mentioned above) matched with the best Vcom are obtained through the lookup with the highest brightness L.

A process of looking up the best Vcom and the best Gamma matched with the best Vcom may be as follows.

a3). In a debugging stage of the display module of the display panel, by adjusting different common voltages Vcom (voltages applied to the second electrode of the light-emitting element), different matched gamma voltages Gamma (voltages applied to the first electrode of the light-emitting element) and corresponding different highest brightnesses may be obtained, so that a match table A2 shown in Table 1 below (i.e., the second mapping relationship mentioned above) may be obtained.

b3). The match table A2 is reversely looked up according to the highest brightness L obtained in act 2, as a result the best Vcom and the best Gamma matched with the best Vcom may be obtained.

For example, three groups of second mapping relationships (as shown in Table 1 above) are taken as an example to illustrate below. A process of looking up the best Vcom and the best Gamma matched with the best Vcom may be as follows.

In act 31), whether L is less than L1 is determined.

In Act 32), if L is less than L1, the Vcom1 and the Gamma1 matched with the Vcom1 are used as the best Vcom and the matched best Gamma; if L is not less than L1, whether L is less than L2 is determined.

In act 33), if L is less than L2, the Vcom2 and the Gamma2 matched with the Vcom2 are used as the best Vcom and the matched best gamma; if L is not less than L2, whether L is less than L3 is determined.

In act 34), if L is less than L3, the Vcom3 and the Gamma3 matched with the Vcom3 are used; if L is not less than L3, the standard Vcom and the standard Gamma matched with the standard Vcom are used as the best Vcom and the matched best Gamma.

In act 4, the grayscale data of the (N+1)th frame is processed according to a ratio between the first grayscale and an actual grayscale (i.e., the second grayscale) of the highest brightness L under the best Vcom and best Gamma to obtain the processed grayscale data of the (N+1)th frame. For example, the grayscale data of the (N+1)th frame is multiplied by the ratio between the first grayscale and the second grayscale to calculate and obtain the processed grayscale data of the (N+1)th frame.

In act 5, as shown in FIG. 8A, the second power supply voltage VSS (that is, the common voltage Vcom) connected to a second electrode of a light-emitting element in the Nth frame is a first voltage V1, and a blank frame between the Nth frame and the (N+1)th frame switches the second power supply voltage VSS (i.e., the common voltage Vcom) connected to the second electrode of the light-emitting element from a first voltage V1 to a third voltage V3; and switches the second power supply voltage VSS (i.e., the common voltage Vcom) connected to the second electrode of the light-emitting element in the (N+1)th frame from a third voltage V1 to a second voltage V2, (i.e., the best Vcom mentioned above). A data signal DATA (that is, the gamma voltage Gamma) connected to a first electrode of a light-emitting element in the Nth frame is a first data signal G1, and the blank frame between the Nth frame and the (N+1)th frame switches the data signal DATA (that is, the gamma voltage Gamma) connected to the first electrode of the light-emitting element from a data signal G1 to a second signal G2 (i.e., the best Gamma matched with the best Vcom mentioned above). A data signal DATA connected to a first electrode of a light-emitting element in the (N+1)th frame is a second data signal G2 (i.e., the best Gamma matched with the best Vcom mentioned above). The blank frame between the Nth frame and the (N+1)th frame applies a drive voltage corresponding to processed gray tone data of the (N+1)th frame to a first electrode of a drive transistor.

In an exemplary embodiment, as shown in FIG. 8A, the third voltage V3 may be equal to zero voltage, wherein an absolute value of the third voltage V3 is smaller than that of the first voltage V1, and the absolute value of the third voltage V3 is smaller than that of the second voltage V2.

In an exemplary embodiment, an absolute value of the best Vcom is not greater than that of the standard Vcom, and the best Gamma is not smaller than the standard Gamma. In this way, brightness of low grayscales can be greatly reduced and the dynamic contrast ratio of the display panel can be improved, and in addition, the power consumption of the display panel can be reduced.

In addition, as shown in FIG. 8B, taking the third voltage V3 being zero as an example, a blank frame between the (N+1)th frame and an (N+2)th frame may switch the second power supply voltage VSS (i.e., the common voltage Vcom) connected to the second electrode of the light-emitting element from a second voltage V2 to a third voltage V3, and a blank frame between the (N+2)th frame and an (N+3)th frame may switch the second power supply voltage VSS (i.e., the common voltage Vcom) connected to the second electrode of the light-emitting element from a fourth voltage V4 to a third voltage V3, wherein, an absolute value of the third voltage V3 is smaller than that of the fourth voltage V4.

In addition, as shown in FIG. 8B, in the embodiment of the present disclosure, voltages may be adjusted according to different images, so a waveform of the second power supply voltage VSS (i.e., the common voltage Vcom) connected to the second electrode of the light-emitting element may change according to a refresh frequency of an image.

Below, performance of the drive method of the above-mentioned display panel will be illustrated with display results obtained by displaying a standard test chart on the display panel in FIGS. 9A to 9C.

Figure 9A:
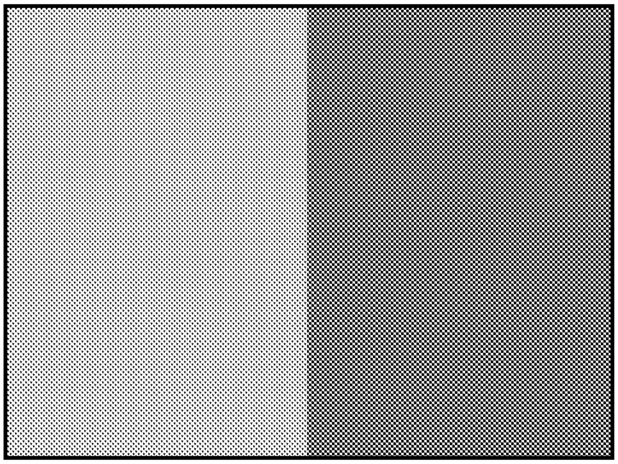
FIG. 9A is a display result diagram of a display panel when a drive voltage of the display panel is not adjusted.
Figure 9B:
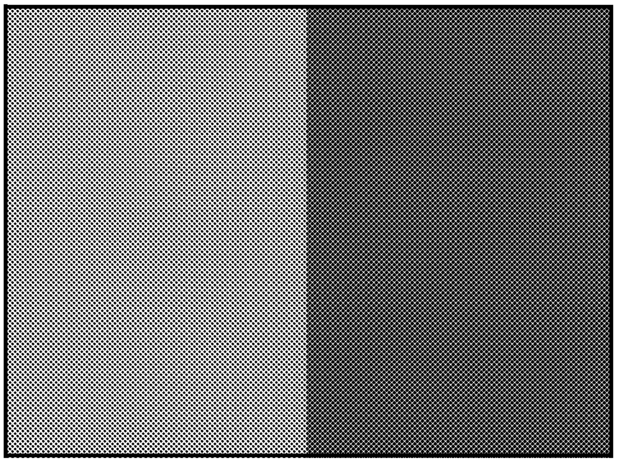
FIG. 9B is a display result diagram of a display panel when only a voltage of a second electrode of a light-emitting element of the display panel is adjusted.
Figure 9C:
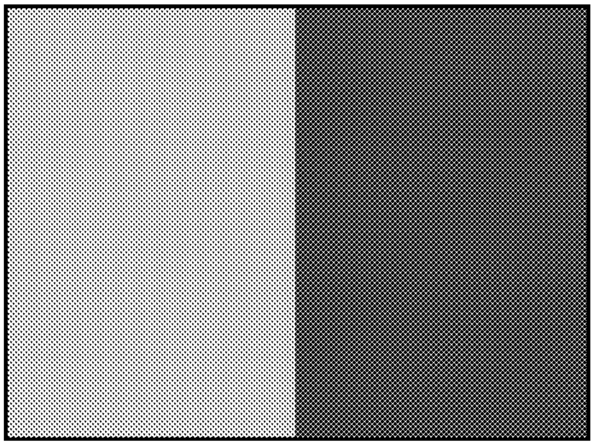
FIG. 9C is a display result diagram of a display panel obtained when a drive method of the display panel according to an embodiment of the present disclosure is used for driving the display panel.

FIG. 9A shows a display result of the display panel obtained when a drive voltage of the display panel is not adjusted (i.e., a voltage of a second electrode and a voltage of a first electrode of a light-emitting element are not adjusted), FIG. 9B shows a display result of the display panel obtained when only a voltage of a second electrode of a light-emitting element of the display panel is adjusted, FIG. 9C shows a display result of the display panel obtained when the drive method of the display panel according to the embodiment of the present disclosure is used to drive the display panel. Comparing the display result in FIG. 9B with that in FIG. 9A, it can be seen that although display brightnesses of the two display panels are different, contrast ratios are the same. Comparing the display result in FIG. 9C with that in FIG. 9A, it can be seen that display brightnesses and contrast ratios of the two display panels are different, and a contrast ratio shown in FIG. 9C is higher than that shown in FIG. 9A. Therefore, according to the drive method of the display panel provided by the embodiment of the present disclosure, voltages of the display panel are adjusted (including that the voltage applied to the second electrode of the display panel and the data signal applied to the first electrode of the display panel are dynamically adjusted) based on grayscale data of different frames through the pixel drive circuit, so that different drive modes can be adopted for the display panel according to different images, and thus the dynamic contrast ratio of the display panel can be increased and the display effect can be improved.

In an exemplary embodiment, the present disclosure further provides a drive device. The drive device may include a processor, a memory, and a computer program stored on the memory and capable of running on the processor, wherein the processor executes the computer program to implement acts of the drive method of the display panel in any of the above-mentioned embodiments of the present disclosure.

Figure 10:
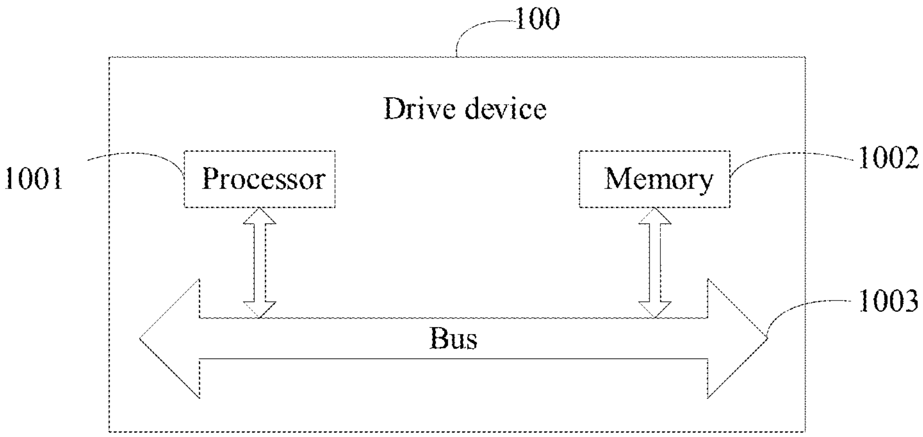
FIG. 10 is a schematic diagram of a structure of a drive device according to an embodiment of the present disclosure.

In an exemplary embodiment, FIG. 10 is a schematic diagram of a structure of a drive device in an embodiment of the disclosure. As shown in FIG. 10, the drive device 100 includes: at least one processor 1001; at least one memory 1002 connected to the processor 1001, and a bus 1003. The processor 1001 and the memory 1002 communicate with each other via the bus 1003; and the processor 1001 is configured to call program instructions in the memory 1002 to execute the acts of the drive method of the display panel in any of the above embodiments.

The processor may be a Central Processing Unit (CPU), a Micro Processor Unit (MPU), a Digital Signal Processor (DSP), an Application Specific Integrated Circuit (ASIC), a Field Programmable Gate Array (FPGA), a transistor logic device, etc., which is not limited in the present disclosure.

The memory may include a Read Only Memory (ROM) and a Random Access Memory (RAM), and provides instructions and data to the processor. A part of the memory may further include a non-volatile random access memory. For example, the memory may further store device type information.

Besides a data bus, a bus may further include a power bus, a control bus and a status signal bus, etc. However, for clarity of illustration, various buses are denoted as the bus in FIG. 9.

In an implementation process, the processing performed by the processing device may be completed by an integrated logic circuit of hardware in the processor or instructions in the form of software. That is, the acts of the method in the embodiments of the present disclosure may be embodied as the execution of hardware processor, or the execution of a combination of hardware in the processor and software modules. The software modules may be located in a storage medium, such as a random access memory, a flash memory, a read-only memory, a programmable read-only memory, an electrically erasable programmable memory, or register. The storage medium is located in the memory, and the processor reads information in the memory and completes the acts of the foregoing methods in combination with hardware thereof. To avoid repetition, the detail will not be described here.

In an exemplary embodiment, the present disclosure further provides a display device. The display device may include the display panel provided by any of the above embodiments of the present disclosure and the drive device provided by any of the above embodiments of the present disclosure.

In an exemplary embodiment, the display device may be any product or component with a display function such as a mobile phone, a tablet computer, a television, a laptop, a navigator, an electronic paper display device, a digital photo frame, a virtual reality device, an augmented reality device. The display device here may further include other conventional components or structures. For example, in order to realize necessary functions of the display device, a person skilled in the art may arrange other conventional components or structures according to actual application scenarios, which are not limited in the embodiments of the present disclosure.

In an exemplary embodiment, the present disclosure further provides a computer-readable storage medium storing executable instructions, and when the executable instructions are executed by a processor, the drive method of the display panel as described in any one of the above embodiments of the present disclosure may be implemented. The drive method of the display panel may be used for driving the display panel provided in the above embodiments of the present disclosure to display, thereby improving a contrast ratio of the display image and improving a display effect.

In an exemplary embodiment, the above computer readable storage medium may be, for example, a ROM/RAM, a magnetic disk, an optical disk, which are not limited in the present disclosure.

The above description of the embodiments of the drive device, display device or computer readable storage medium is similar to the description of the embodiments of the above drive method of the display panel, and has advantages similar to those of the method embodiments. For the technical details which are not disclosed in the drive device, the display device, and the computer-readable storage medium embodiments of the present disclosure, please refer to the description of the method embodiments of the present disclosure, which will not be repeatedly described here.

In the description of the present disclosure, it should be understood that an orientation or position relationship indicated by the terms "middle", "upper", "lower", "front", "rear", "vertical", "horizontal", "top", "bottom", "inner", "outer" and the like is based on the orientation or position relationship shown in the accompanying drawings, which is only for the convenience of describing the present disclosure and simplifying the description, rather than indicating or implying that the apparatus or element referred to must have the specific orientation, or be constructed and operated in the specific orientation, and thus cannot be interpreted as a limitation on the present disclosure.

Those of ordinary skill in the art may understand that all or some of the acts in the above disclosed method, the system, and functional modules/units of the device disclosed above may be implemented as software, firmware, hardware, and an appropriate combination thereof. In a hardware implementation, the division between functional modules/units mentioned in the above description does not necessarily correspond to the division of physical components. For example, a physical component may have a plurality of functions, or a function or an act may be performed by several physical components in cooperation. Some or all of the components may be implemented as software executed by a processor, such as a digital signal processor or a microprocessor, or as hardware, or as an integrated circuit, such as an application specific integrated circuit. Such software may be distributed on a computer readable medium, which may include a computer storage medium (or a non-transitory medium) and a communication medium (or a transitory medium). As is well known to those of ordinary skill in the art, the term "computer storage medium" includes volatile and nonvolatile, removable and non-removable media implemented in any method or technology for storing information (such as computer readable instructions, data structures, program modules or other data). The computer storage medium includes, but is not limited to, a RAM, a ROM, an EEPROM, a flash memory or another memory technology, a CD-ROM, a digital versatile disk (DVD) or another optical disk storage, a magnetic cassette, a magnetic tape, a magnetic disk storage or another magnetic storage device, or any other medium that may be used for storing desired information and may be accessed by a computer. Furthermore, it is well known to those of ordinary skill in the art that the communication medium typically contains computer readable instructions, a data structure, a program module, or other data in a modulated data signal such as a carrier or another transmission mechanism, or the like, and may include any information delivery medium.

Although the embodiments disclosed in the present disclosure are as described above, the described contents are only the embodiments for facilitating understanding of the present disclosure, which are not intended to limit the present disclosure. Any person skilled in the art to which the present disclosure pertains may make any modifications and variations in the form and details of implementations without departing from the spirit and the scope of the present disclosure, but the protection scope of the present disclosure shall still be subject to the scope defined in the appended claims.

What is claimed is:

1. A drive method of a display panel, wherein, the display panel comprises a base substrate, a pixel drive circuit, and a light-emitting element which are stacked in sequence, wherein the light-emitting element comprises a first electrode, an organic light-emitting layer, and a second electrode which are stacked in sequence; the pixel drive circuit comprises a drive transistor coupled with the first electrode, a first power supply terminal coupled with the drive transistor, and a second power supply terminal coupled with the second electrode;

the drive method comprises:

applying, in an Nth frame, a first voltage to the second electrode and a first data signal matched with the first voltage to the first electrode through the pixel drive circuit based on grayscale data of the Nth frame; wherein N is a positive integer;

applying, in an (N+1)th frame, a second voltage to the second electrode and a second data signal matched with the second voltage to the first electrode through the pixel drive circuit based on grayscale data of the (N+1)th frame, wherein the first voltage is different from the second voltage.

2. The drive method of claim 1, further comprising:

inserting a blank frame between the Nth frame and the (N+1)th frame, and in the blank frame, switching a voltage signal applied to the second electrode from the first voltage to a third voltage through the pixel drive circuit, wherein, an absolute value of the third voltage is less than that of the first voltage, and the absolute value of the third voltage is less than an absolute value of the second voltage.

3. The drive method of claim 2, wherein the third voltage is a zero voltage.

4. The drive method of claim 2, further comprising: cutting off an electrical connection between the first power supply terminal and the drive transistor in the blank frame.

5. The drive method of claim 1, wherein an absolute value of the first voltage is greater than that of the second voltage when a highest grayscale of the Nth frame is greater than that of the (N+1)th frame.

6. The drive method of claim 1, wherein an absolute value of the first voltage is greater than that of the second voltage when a lowest grayscale of the Nth frame is greater than that of the (N+1)th frame.

7. The drive method of claim 1, further comprising: applying a reset voltage to the first electrode through the pixel drive circuit in a reset stage of the Nth frame, or applying a reset voltage to the first electrode through the pixel drive circuit in a reset stage of the (N+1)th frame.

8. The drive method of claim 1, wherein for a pixel with same grayscales in the Nth frame and the (N+1)th frame, a data signal provided to the pixel in the first data signal is different from a data signal provided to the pixel in the second data signal.

9. The drive method of claim 1, wherein for a pixel with same grayscales in the Nth frame and the (N+1)th frame, when a highest grayscale of the Nth frame is greater than that of the (N+1)th frame, a voltage of a data signal provided to the pixel in the first data signal is smaller than that of a data signal provided to the pixel in the second data signal.

10. The drive method of claim 1, wherein for a pixel with same grayscales in the Nth frame and the (N+1)th frame, when a lowest grayscale of the Nth frame is greater than that of the (N+1)th frame, a voltage of a data signal provided to the pixel in the first data signal is smaller than that of a data signal provided to the pixel in the second data signal.

11. The drive method of claim 1, wherein an absolute value of the first voltage is not higher than that of a standard common voltage, and an absolute value of the second voltage is not higher than that of the standard common voltage, and the standard common voltage is a voltage of the second electrode when a white image is displayed.

12. The drive method of claim 1, wherein a voltage of the first data signal is not less than a standard gamma voltage, and a voltage of the second data signal is not less than the standard gamma voltage, and the standard gamma voltage is a voltage of the first electrode when a white image is displayed.

13. The drive method of claim 1, wherein applying the second voltage to the second electrode and the second data signal to the first electrode through the pixel drive circuit based on the grayscale data of the (N+1)th frame comprises:

determining a first grayscale based on the grayscale data of the (N+1)th frame;

determining a first emission brightness corresponding to the first grayscale according to a first mapping relationship established in advance; wherein the first mapping relationship is used for describing a relationship between grayscales and emission brightnesses when the display panel is driven by applying a standard common voltage to the second electrode and a standard gamma voltage to the first electrode;

determining whether there is a mapping relationship matched with the first emission brightness in at least one second mapping relationship established in advance; wherein, the second mapping relationship is used for describing a mapping relationship among a candidate common voltage, an emission brightness and a candidate gamma voltage;

if so, applying a candidate common voltage in the matched mapping relationship to the second electrode as the second voltage, and applying a candidate gamma voltage in the matched mapping relationship to the first electrode as the second data signal; or, if not, applying the standard common voltage to the second electrode as the second voltage, and applying the standard gamma voltage to the first electrode as the second data signal.

14. The drive method of claim 13, further comprising:

determining a second grayscale corresponding to an emission brightness in the matched mapping relationship according to a third mapping relationship established in advance; wherein, the third mapping relationship is used for describing a relationship between grayscales and emission brightnesses when the display panel is driven by the candidate common voltage and the candidate gamma voltage in the matched mapping relationship;

multiplying the grayscale data of the (N+1)th frame by a ratio between the first grayscale and the second grayscale to obtain processed grayscale data of the (N+1)th frame; and applying a drive voltage corresponding to the processed grayscale data of the (N+1)th frame to the drive transistor.

15. The drive method of claim 13, wherein determining whether there is the mapping relationship matched with the first emission brightness in at least one second mapping relationship established in advance, comprises:

comparing the first emission brightness with emission brightnesses of the at least one second mapping relationship;

determining whether there is a second emission brightness matched with the first emission brightness in the emission brightnesses of the at least one second mapping relationship according to a comparison result;

if there is the second emission brightness matched with the first emission brightness in the emission brightnesses of the at least one second mapping relationship, there is a mapping relationship matched with a first emission brightness value in the at least one second mapping relationship; otherwise, there is no mapping relationship matched with the first emission brightness value in the at least one second mapping relationship.

16. The drive method of claim 15, wherein determining whether there is the second emission brightness matched with the first emission brightness in the emission brightnesses of the at least one second mapping relationship according to the comparison result comprises:

if the first emission brightness is less than a minimum emission brightness in the emission brightnesses of the at least one second mapping relationship, determining that there is the second emission brightness matched with the first emission brightness in the emission brightnesses of the at least one second mapping relationship, wherein the second emission brightness is the minimum emission brightness;

or, if the first emission brightness is less than a maximum emission brightness in the emission brightnesses of the at least one second mapping relationship and not less than other emission brightnesses except the maximum emission brightness of the at least one second mapping relationship, determining that there is the second emission brightness matched with the first emission brightness value in the emission brightnesses of the at least one second mapping relationship, wherein the second emission brightness is the maximum emission brightness;

or, if the first emission brightness is in a emission brightness interval formed by two adjacent emission brightnesses in the emission brightnesses of the at least one second mapping relationship, determining that there is the second emission brightness matched with the first emission brightness in the emission brightnesses of the at least one second mapping relationship, wherein the second emission brightness is an emission brightness corresponding to a larger terminal point of the emission brightness interval.

17. The drive method of claim 13, wherein determining the first grayscale based on the grayscale data of the (N+1)th frame comprises:

determining a highest grayscale from the grayscale data of the (N+1)th frame; determining the highest grayscale as the first grayscale;

or, determining highest X grayscales from the grayscale data of the (N+1)th frame; determining a mean value of the highest X grayscales as the first grayscale; wherein X is a positive integer greater than 1;

or, determining grayscales located in a preset area from the grayscale data of the (N+1)th frame; determining a highest grayscale among the grayscales in the preset area as the first grayscale.

18. A non-transitory computer readable storage medium storing computer executable instructions, wherein the computer executable instructions are used for performing acts of the drive method of the display panel of claim 1.

19. A drive device, comprising: a memory, a processor and a computer program stored on the memory and executable on the processor, wherein acts of the drive method of the display panel of claim 1 are implemented when the processor executes the program.

20. A display device, comprising a display panel and the drive device of claim 19.

* * * * *